(12) United States Patent
Krasser et al.

(10) Patent No.: US 9,403,243 B2
(45) Date of Patent: Aug. 2, 2016

(54) PROCESS FOR MANUFACTURING A YANKEE CYLINDER

(75) Inventors: Josef Krasser, Rein (AT); Markus Maier, Lassnitzhohe (AT); Ludwig Kahsiovsky, Weinitzen (AT)

(73) Assignee: Andritz AG, Graz (AT)

( * ) Notice: Subject to any disclaimer, the term of this patent is extended or adjusted under 35 U.S.C. 154(b) by 133 days.

(21) Appl. No.: 14/006,246

(22) PCT Filed: Mar. 19, 2012

(86) PCT No.: PCT/EP2012/001200
§ 371 (c)(1),
(2), (4) Date: Oct. 16, 2013

(87) PCT Pub. No.: WO2012/126603
PCT Pub. Date: Sep. 27, 2012

(65) Prior Publication Data
US 2014/0033789 A1    Feb. 6, 2014

(30) Foreign Application Priority Data

Mar. 21, 2011  (AT) .................................. A 396/2011
Sep. 5, 2011   (EP) ..................................... 11007162

(51) Int. Cl.
| | |
|---|---|
| B23K 37/00 | (2006.01) |
| D21F 5/00 | (2006.01) |
| B23K 37/08 | (2006.01) |
| B23K 37/02 | (2006.01) |
| D21F 5/02 | (2006.01) |
| D21F 5/18 | (2006.01) |

(52) U.S. Cl.
CPC ................. *B23K 37/08* (2013.01); *B23K 37/02* (2013.01); *D21F 5/021* (2013.01); *D21F 5/181* (2013.01); *Y10T 29/49393* (2015.01)

(58) Field of Classification Search
None
See application file for complete search history.

(56) References Cited

U.S. PATENT DOCUMENTS

| | | | | |
|---|---|---|---|---|
| 3,052,039 | A | * | 9/1962 | Johnson .......................... 34/110 |
| 4,196,689 | A | * | 4/1980 | Wolf et al. ....................... 165/91 |
| 4,320,582 | A | * | 3/1982 | Klippstein et al. .............. 34/454 |
| 6,018,870 | A | * | 2/2000 | Marschke et al. ........ 29/895.213 |
| 6,942,139 | B2 | * | 9/2005 | Lipnevicius .................. 228/102 |
| 7,802,412 | B2 | * | 9/2010 | Jensen ....................... 52/651.07 |
| 8,398,822 | B2 | * | 3/2013 | Mennucci et al. ............. 162/357 |
| 8,438,752 | B2 | * | 5/2013 | Mennucci et al. .............. 34/117 |
| 2002/0079303 | A1 | * | 6/2002 | Offer et al. ................ 219/137 R |
| 2007/0289156 | A1 | | 12/2007 | Kloibhofer et al. |

FOREIGN PATENT DOCUMENTS

| | | |
|---|---|---|
| CN | 1105079 A | 7/1995 |
| CN | 101941112 | 1/2011 |
| WO | 2008040844 A1 | 4/2008 |
| WO | 2008105005 A1 | 9/2008 |
| WO | 2011030363 | 3/2011 |

* cited by examiner

*Primary Examiner* — Devang R Patel
(74) *Attorney, Agent, or Firm* — Alix, Yale & Ristas, LLP

(57) ABSTRACT

The invention relates to a process for manufacturing a steel Yankee cylinder (1), where the Yankee cylinder (1) is welded together from individual pre- or finish-machined cylinder sections (8, 9, 10).
The invention also relates to a Yankee cylinder (1) that is manufactured using the manufacturing process according to the invention.

14 Claims, 2 Drawing Sheets

PROCESS FOR MANUFACTURING A YANKEE CYLINDER

The subject of the invention is a process for manufacturing a steel Yankee cylinder. The invention also relates to a Yankee cylinder that is manufactured using the manufacturing process according to the invention.

So-called Yankee cylinders are commonly used in the drying process for the production of paper webs or tissue.

Yankee cylinders usually have a very large diameter. They are heated from the inside using steam and are difficult to manufacture because of the stringent demands to be met relating to the internal pressures the cylinder must withstand, the cylinder's leak-tightness, and its large diameter.

Standard Yankee cylinders may have the following dimensions:
Cylinder diameter: 2000 mm to 6500 mm
Diameter of hollow shaft: 1000 mm to 2500 mm
Cylinder length: 3000 mm to 8500 mm
Cylinder mass: 35 t to 140 t The vast majority of these cylinders are made of cast iron, however Yankee cylinders made of steel are also known from U.S. Pat. No. 4,196,689 and from WO 2008/105005 A1.

U.S. Pat. No. 3,052,039, for example, discloses a steel Yankee cylinder in which the cylinder shell is welded together from individual shell plates. After being welded together, the finished cylinder shell then undergoes machining on the inside and the outside.

Similarly, U.S. Pat. No. 6,018,870 discloses a steel drying cylinder that is made up of several segments. However, this is not a Yankee cylinder, but a drying cylinder with steam bore holes in the cylinder shell.

Normally, a Yankee cylinder consists of a cylindrical shell surface, which is closed at the ends with end covers. The two covers can either be bolted or welded to the cylinder shell.

A Yankee cylinder rotates via journals and has a hollow shaft or axle inside through which the steam for heating the cylinder is introduced and exhaust steam and condensate can be removed.

The cylinder shell often has a large number of grooves on its inner surface, which improve heat transition from the heated inside of the cylinder to the cylinder surface, without substantially diminishing the component strength of the shell.

The conventional process for production of a welded Yankee cylinder shell features the following manufacturing sequence:
1. Cutting and curling the shell plates;
2. Welding the shell plates together to produce the finished cylinder shell;
3. Machining the entire cylinder shell on the outside and the inside, and on the end faces;
4. Attaching the face end covers by bolting or welding on;

As the cylinder shell has a diameter of up to 6500 mm and is 8500 mm long, very large and expensive tools are needed to machine the cylinder shell. Mechanical and plant engineering companies rarely have such large machines at their disposal. In the present invention, machining refers to lathing and milling work steps.

The aim of the invention is thus to describe a lower cost production process for a Yankee cylinder that meets all the requirements in terms of quality and dimensional accuracy.

The manufacturing process for the steel cylinder shell according to the invention contains the following steps:
a.) Cutting and curling the shell plates;
b.) Welding the shell plates together to form two or more cylinder sections;
c.) Mechanical lathing of the individual cylinder sections on the inside and on the respective end faces;
d.) Welding the individual cylinder sections to form a complete cylinder shell.

The idea of the invention is thus based on producing shorter cylinder sections and machining them, at least on the inside.

During this lathing work on the inside, the cylinder wall is smoothed on the one hand, and an exact cylinder shape is produced on the other hand. According to the invention, the insides of the cylinder sections are largely finish-machined before welding together to form a complete cylinder shell (step d.)) so that only the inner seam welded in step d.) requires a little re-machining if need be. This re-machining can also be performed with smaller machine tools.

The Yankee cylinder preferably has grooves running in circumferential direction on the inside. According to the invention, these grooves are then manufactured in step c.).

The individual sections are not welded together to form a complete Yankee cylinder until lathing work on the inside of the Yankee has been completed. Then it is only necessary to re-machine the weld on the inside of the Yankee, and this can be done with relatively small machines.

As a result of the process according to the invention, it is now also possible to produce very large Yankee cylinders with a length of more than 6 meters, for example, with relatively small lathing machines.

As a result, easier machining is possible by lathing the shorter cylinder sections and besides, the process does not require such large (high) machining equipment.

It is favourable if the individual cylinder sections are also lathed on the outer side before step d.)

The individual cylinder sections are preferably finish-machined on the inside and outside, and on the end faces after step c.) and before step d.).

As a result, no large machine tools are needed for the entire machining work on the cylinder shell, i.e. for lathing and milling work.

The entire cylinder shell only needs to be ground after welding. The grinding device, however, is primarily an auxiliary structure that is much less complex than a lathing machine.

It is favourable if the individual cylinder sections are welded according to step d.), at least from one side, by a mobile welding robot or an electro-mechanical welding carriage that runs on an auxiliary rail mounted on the cylinder sections.

A mobile welding robot is a welding robot that can be transported easily and with little expense and effort to different places of use. Narrow gap welding robots and electro-mechanical welding carriages have proved particularly useful in this work. It is thus possible to finish assembling the Yankee cylinder at the customer's site, for example, without the customer being in possession of special machine tools or welding equipment.

Until now, large Yankee cylinders could not be supplied to some customers, or only at considerable expense and effort, because it was very difficult or impossible to transport the Yankee cylinders to the final location due to their size or weight.

The manufacturing process according to the invention now makes it possible to supply large Yankee cylinders to these customers as well more easily. In this case, steps a.), b.), and c.) are performed at the usual manufacturing location—a plant engineering company for example. Step d.) then takes place preferably in the vicinity of the final location of the Yankee cylinder, thus at the mill location of the Yankee.

Ideally, the cylinder sections are welded directly on the mill premises of the paper machine or tissue machine operator.

The individual cylinder sections, preferably with the end covers already mounted at the cylinder ends, can be delivered to the customer much more easily and much cheaper than fully assembled cylinders.

Then it is also possible to finish-machine the outer side of the individual cylinder sections on site or in the vicinity of the final location, but of course it is more favourable if the cylinder sections shipped from the manufacturing location have already been pre- and finish-machined.

In order to ensure that the geometric shape of the cylinder is not altered due to welding distortion or shrinkage, a suitable welding process must be selected with which to join the individual cylinder sections to form a complete cylinder. It has proved very favourable to use the narrow gap welding process to weld the cylinder sections together. In addition to the excellent welding quality, this also guarantees only marginal welding shrinkage.

Any counter-welding required from the other side can be performed using normal welding processes.

It is favourable if the internal weld—the seam on the inside of the cylinder—is made with the narrow gap welding process as this weld contributes substantially to the stability of the Yankee cylinder. The narrow gap welding process is performed preferably with a welding robot or an electro-mechanical welding carriage. The seam on the outside of the cylinder can then be welded by hand.

If the cylinders are grooved, the weld can be either between the grooves in the cylinder or in one of the cylinder grooves.

The weld formed in step d.) can then be re-machined if necessary, however this can also be done with smaller machine tools.

The fully assembled Yankee cylinder can then be ground, coated, and ground once again. The grinding process can also be performed on site with the aid of smaller auxiliary structures.

In the following, the invention is described on the basis of drawings.

Here:

Figure 4A:
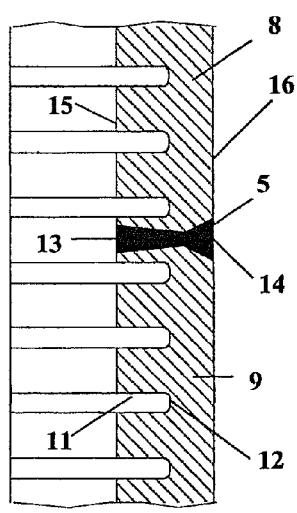

FIGS. 4a, b, and c show different versions of the weld;

Identical reference figures in the individual figures refer to the same components in each case.

Figure 1:
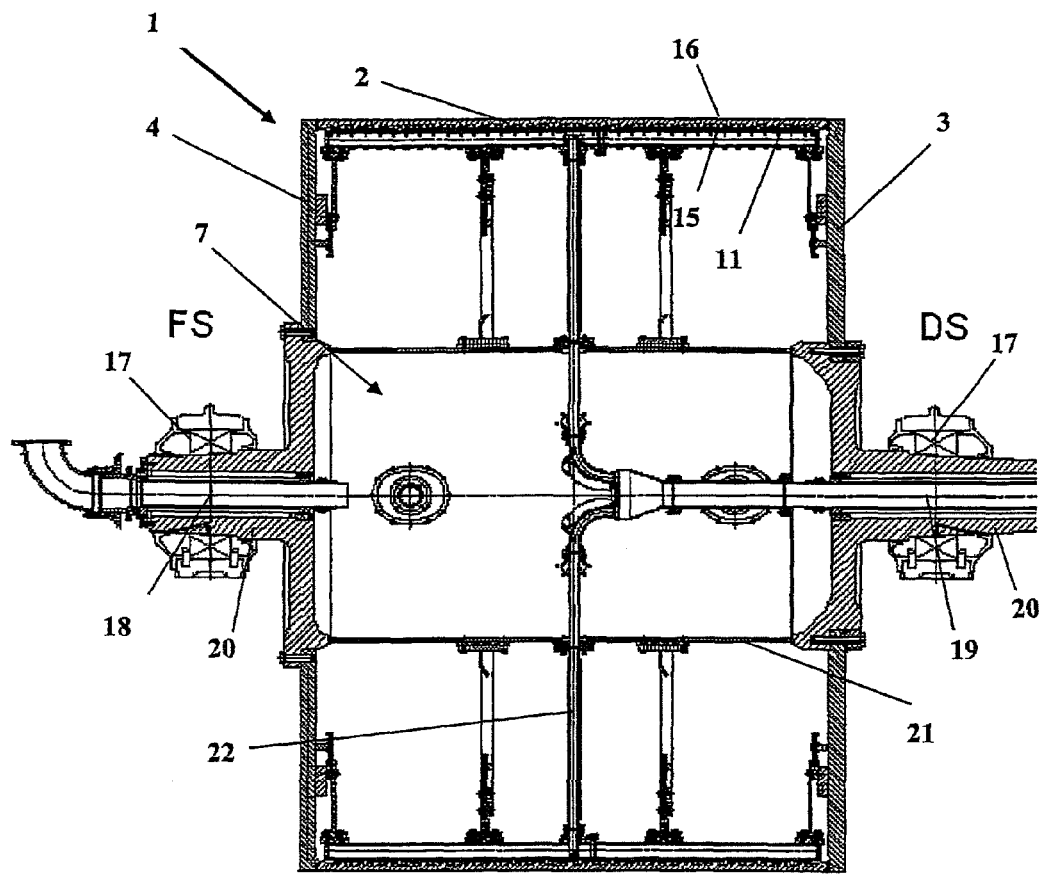
FIG. 1 shows a Yankee cylinder made of steel.

FIG. 1 shows a Yankee cylinder 1. It comprises a cylindrical steel shell 2, which is welded or bolted to the two end covers 3 and 4.

Inside the Yankee cylinder 1 there is a central shaft 7 with the central part 21 and the two bearing journals 20, which rotate in the bearings 17.

Steam is fed to the Yankee cylinder 1 during operation through the steam feed 18. Exhaust steam and condensate are discharged from the Yankee cylinder through the condensate piping 22 and 19, respectively.

There are a large number of grooves 11 on the inside of the cylinder 15, which run in the circumferential direction of the Yankee cylinder 1. The heat transition to the outside of the cylinder 16 is enhanced by the grooves 11 and condensate removal is facilitated through the condensate piping 22.

In the state-of-the-art manufacturing process used to date, individual shell plates are cut, curled, and welded together to form cylinder sections. After this, the entire cylinder shell is machined on the inside and outside, as well as on the end faces. Finally, the end face covers are bolted or welded on.

Very large machines are needed for mechanical lathing, especially for manufacture of very large Yankee cylinders over five meters long.

In the present invention, individual shell plates made of steel are cut and curled in a first step a.) and then welded together to form individual cylinder sections 8, 9, 10 in the second step b.). These cylinder sections 8, 9, 10 are then machined on the inside 15 and on the end faces. This mechanical lathing can now be performed with much smaller machines, with a machining height of only 3 m instead of 6 m, for example. Ideally, the individual cylinder sections 8, 9, 10 are finish-machined on the inside. Only then can these preferably finish-machined cylinder sections 8, 9, 10 be welded together to form a complete cylinder shell 2.

Before welding the individual cylinder sections 8, 9, 10 together, the two end covers 3 and 4 can be mounted on the end faces.

Figure 2:
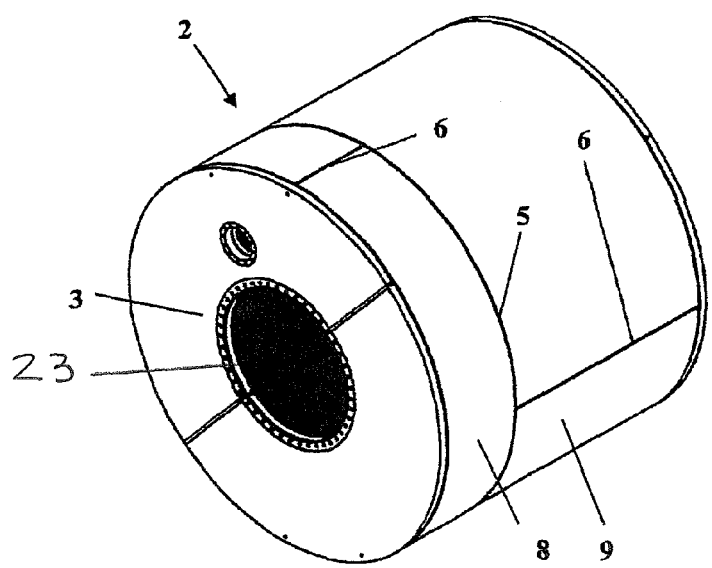
FIG. 2 shows the fully assembled cylinder shell.

FIG. 2 shows an example of a fully assembled cylinder shell 2. The figure shows the two cylinder sections 8 and 9 and the two welds 6, which join the curled shell plates to form one cylinder section 8, 9, 10. One cylinder section 8, 9, 10 can be formed by joining several individual shell plates together. FIG. 2 shows the circumferential seam 5 welded in process step d.) and which joins the two cylinder sections 8 and 9. This seam 5 was not welded until the individual cylinder sections 8, 9 had been finish-machined.

Figure 3A:
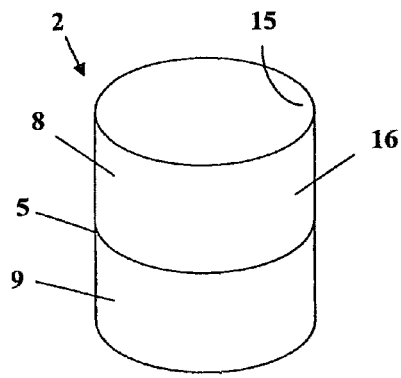
FIGS. 3a and 3b show the possible location of the welds.
Figure 3B:
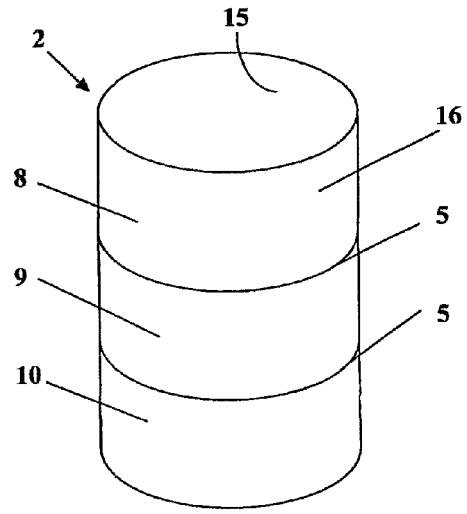

For example, the cylinder shell 2 can be made up of two individual cylinder sections 8, 9, as is shown in FIGS. 2 and 3a, however it can also be made up of three or more individual cylinder sections 8, 9, 10, as shown in FIG. 3b.

The narrow groove welding process mentioned is particularly suitable for welding the individual cylinder sections 8, 9, 10 together. Narrow gap welding is a well-established process in welding circles and one which minimizes the amount of heat applied to the material, thus also minimizing heat distortion. In this process, gaps are welded measuring between 2 and 20 mm, preferably using TIG welding and with an oscillating electrode and/or a narrow gap torch.

This welding process can be performed, at least from the inside 15, by a mobile welding robot or an electro-mechanical welding carriage, which runs on an auxiliary rail mounted on the cylinder sections 8, 9, 10.

Figure 4B:
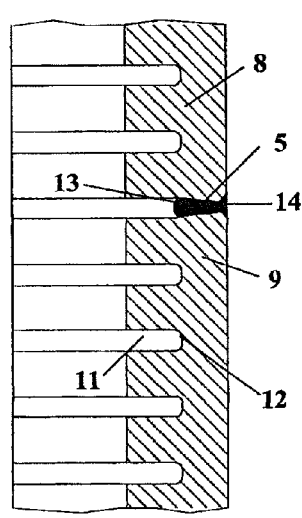
Figure 4C:
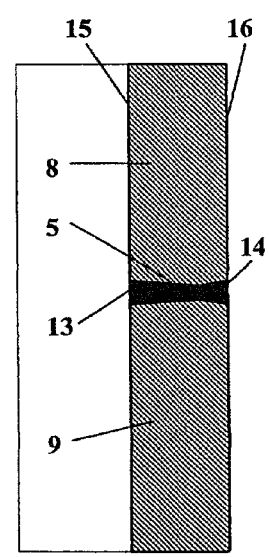

FIGS. 4a to 4c show different versions of the welded joint 5 between the cylinder sections 8 and 9.

In pressure vessels like a Yankee cylinder 1, the welded joint 5 is usually formed by an inner weld 13 on the inside of the cylinder 15 and an outer weld 14 on the outside of the cylinder 16.

FIGS. 4a and 4b show a cylinder shell 2 with grooves 11 on the inside 15 of the cylinder. The inner seam 13 can be welded between two grooves 11, as is shown in FIG. 4a, or in one groove 11, thus on the base of the groove 12. An inner weld 13 of this type is shown in FIG. 4b.

FIG. 4c shows an inner weld 13 and an outer weld 14 on a cylinder shell 2 without grooves.

The invention claimed is:

1. A process for manufacturing a steel Yankee cylinder, comprising the ordered steps of:
   a.) cutting and curling individual shell plates;
   b.) welding the shell plates together (6) to form individual cylinder sections (8, 9, 10), each section having an inside (15), an outside (16), and axially opposite end faces;
   c.) mechanically lathing the individual cylinder sections on the inside and on the end faces and mounting two end face covers (3, 4) on respective two cylinder sections;
   d.) welding the individual cylinder sections together at respective end faces with inner and outer seam welds to form a complete shell of said Yankee cylinder wherein the inner seam welds are by narrow gap welding using an electro-mechanical welding carriage inside the shell and a length of the complete shell of said Yankee cylinder is at least 5 meters;

e.) wherein the inside of each individual cylinder section is in a substantially finish-machined condition before the individual cylinder sections are welded together; and f.) wherein any machining performed inside the shell after forming the complete shell, is only for finishing the inner seam weld (13).

2. The process according to claim 1, wherein circumferential grooves (11) are manufactured on the inside (15) of the cylinder sections (8, 9, 10) during the mechanical lathing work in step c.).

3. The process according to claim 1, wherein the individual cylinder sections (8, 9, 10) are also lathed on the outside (16) before step d.).

4. The process according to claim 1, wherein the individual cylinder sections (8, 9, 10) have circumferential grooves (11) on the inside (15) and the cylinder sections (8, 9, 10) are seam welded in the base (12) of the groove.

5. The process according to claim 1, wherein steps a.), b.), and c.) are conducted at a specific manufacturing location, and step d.) is not carried out at said manufacturing location.

6. The process according to claim 5, wherein step d.) is carried out at a production plant of a paper or tissue machine operator.

7. The process according to claim 6, wherein the mechanically lathed cylinder sections (8, 9, 10) are delivered individually from the manufacturing location to the production plant.

8. The process according to claim 1, wherein the weld (5) formed in step d.) is finish machined.

9. The process according to claim 1, wherein the complete cylinder shell (2) of the Yankee cylinder (1) is coated and ground.

10. The process according to claim 2, wherein the individual cylinder sections (8, 9, 10) are also lathed on the outside (16) before step d.).

11. The process according to claim 1, wherein the welding (5) the individual cylinder sections together at respective end faces is first performed with inner seam welds (13, 14) to form a complete shell (2) of said Yankee cylinder, followed by performing said outer seam welds.

12. A process for manufacturing a steel Yankee cylinder, comprising the steps of:

a.) cutting and curling individual shell plates;

b.) welding the shell plates together (6) to form individual cylinder sections (8, 9, 10), each section having an inside (15), an outside (16), and axially opposite end faces;

c.) mechanically lathing the individual cylinder sections on the inside and on the end faces;

d.) mounting two round end face covers coaxially on respective two cylinder sections;

e.) stacking all the individual cylinder sections;

f.) joining the stacked individual cylinder sections together at respective end faces with inner, narrow gap seam welds using an electro-mechanical welding carriage inside the shell to form a complete shell of said Yankee cylinder, wherein a length of the complete shell of said Yankee cylinder is at least 5 meters;

g.) further joining (5) the cylinder sections of the complete shell at respective end faces with outer seam welds (14).

13. The process of claim 12, wherein after the welding carriage has been removed, the outer weld seam is made by hand.

14. The process of claim 12, wherein in step b.) each section is a cylinder having a diameter in the range of 2000-6500 mm;

steps a.)-c.) are performed at a manufacturing location;

steps e.)-g.) are performed at the site of a paper mill; and at the site of said paper mill, said Yankee cylinder is completed with said Yankee shell, with a length in the range of 3000-8500 mm.

* * * * *